(12) United States Patent
Guo et al.

(10) Patent No.: US 7,957,779 B2
(45) Date of Patent: Jun. 7, 2011

(54) SLIDABLE MOBILE PHONE

(75) Inventors: Shu-Ming Guo, Taipei (TW);
Wen-Hsiung Shih, Taipei (TW);
Yen-Chih Lin, Taipei (TW); Kuo-Hsing Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 697 days.

(21) Appl. No.: 12/022,964

(22) Filed: Jan. 30, 2008

(65) Prior Publication Data

US 2008/0188274 A1    Aug. 7, 2008

(30) Foreign Application Priority Data

Feb. 5, 2007    (TW) ............................... 96104076 A (51) Int. Cl.
*H04M 1/00*    (2006.01)
(52) U.S. Cl. .............. 455/575.4; 455/550.1; 379/433.12
(58) Field of Classification Search .... 455/575.1–575.4, 455/550.1; 379/433.01, 433.11, 433.12, 379/440
See application file for complete search history.

(56) References Cited

U.S. PATENT DOCUMENTS

| 6,950,316 | B2 | 9/2005 | Pan et al. |
| 7,515,930 | B2 * | 4/2009 | Eromaki ................... 455/550.1 |
| 2007/0091582 | A1 * | 4/2007 | Ku et al. ...................... 361/814 |

FOREIGN PATENT DOCUMENTS

| CN | 1655467 A | 8/2005 |
| CN | 1839553 A | 9/2006 |
| TW | I271087 | 1/2007 |
| TW | M304858 | 1/2007 |

* cited by examiner

*Primary Examiner* — Nhan Le (57) ABSTRACT

A slidable mobile phone includes a main body, a sliding cover and a positioning device. The main body includes a first combining component and an upper casing. The sliding cover includes a second combining component and a lower casing. A first sliding part is provided on the first combining component, and a second sliding part and a pointing device by detecting the pressed direction are provided on the second combining component. The second sliding part is connected to and relatively slides along the first sliding part, and the pointing device by detecting the pressed direction is used for controlling the slidable mobile phone. The positioning device includes two magnetic elements which are provided on the first combining component and the second combining component, respectively.

17 Claims, 12 Drawing Sheets

SLIDABLE MOBILE PHONE

BACKGROUND OF THE INVENTION

1. Field of the Invention

The invention relates to a slidable mobile phone and, more particularly, to a slidable mobile phone having a pointing device by detecting the pressed direction.

2. Description of the Related Art

Figure 1A:
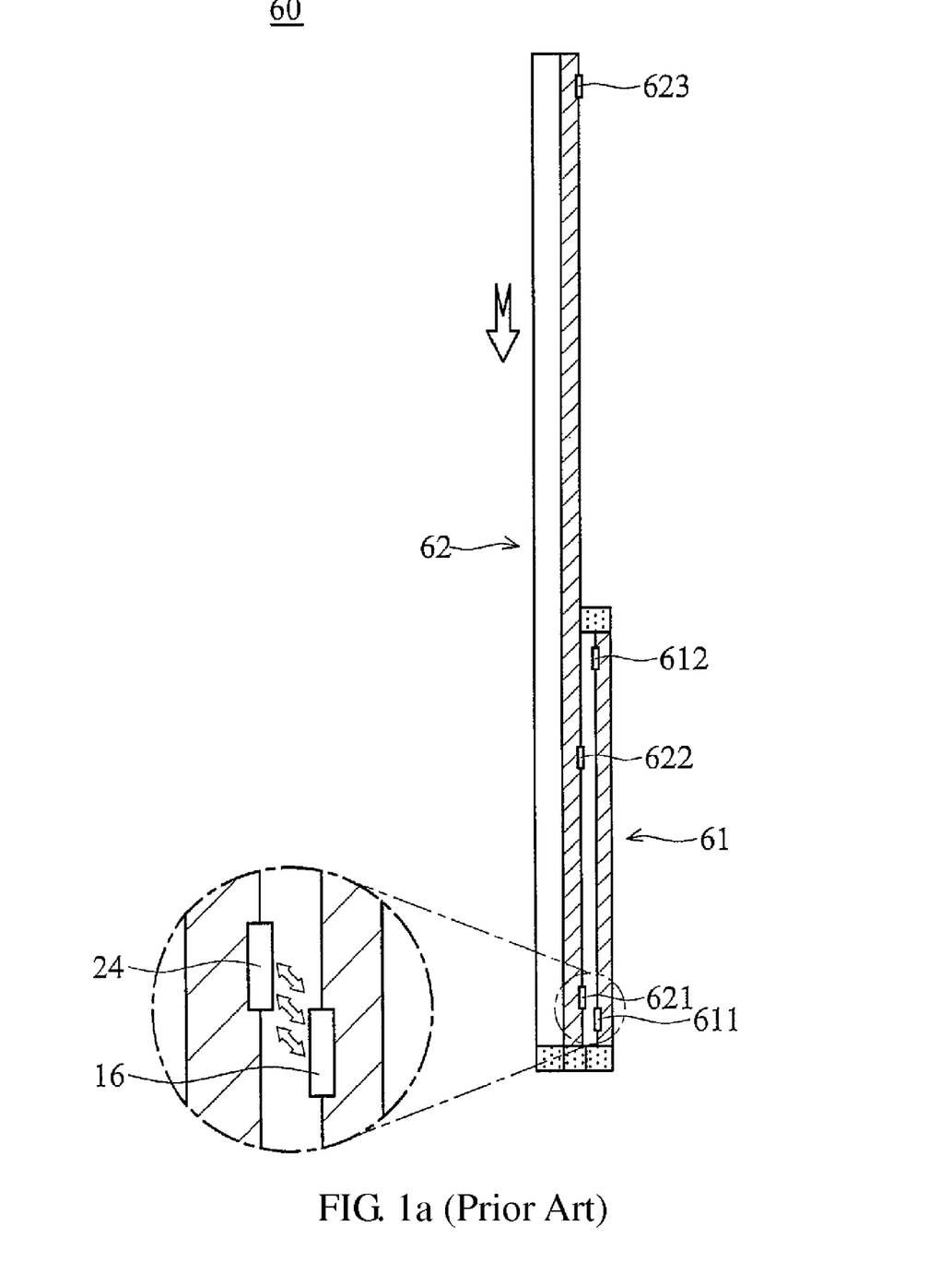
FIGS. 1a-1c are schematic diagrams showing opening actions of a conventional slidable mobile phone.
Figure 1B:
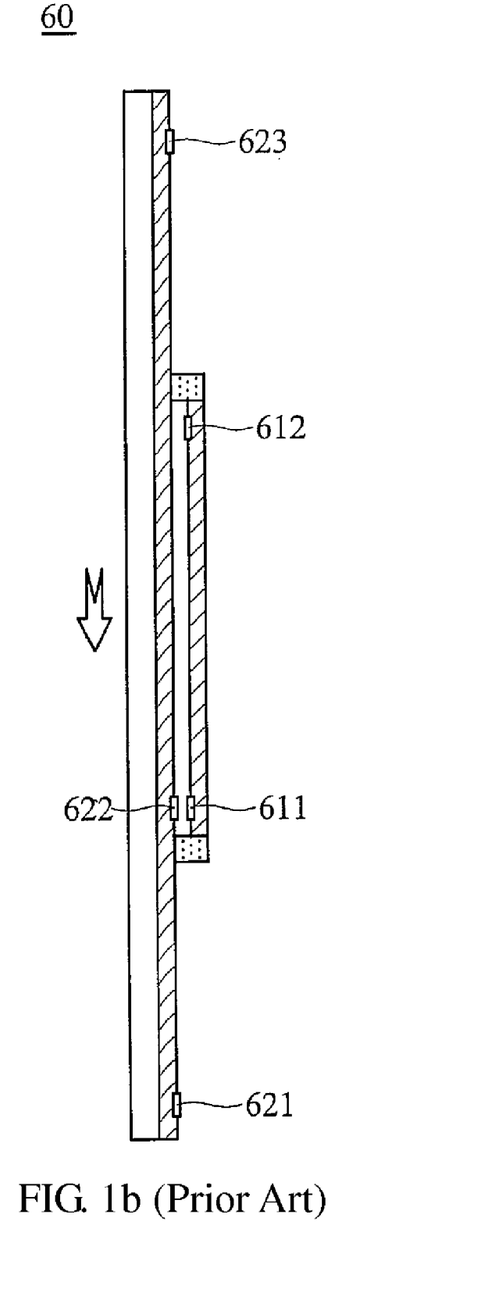
Figure 1C:
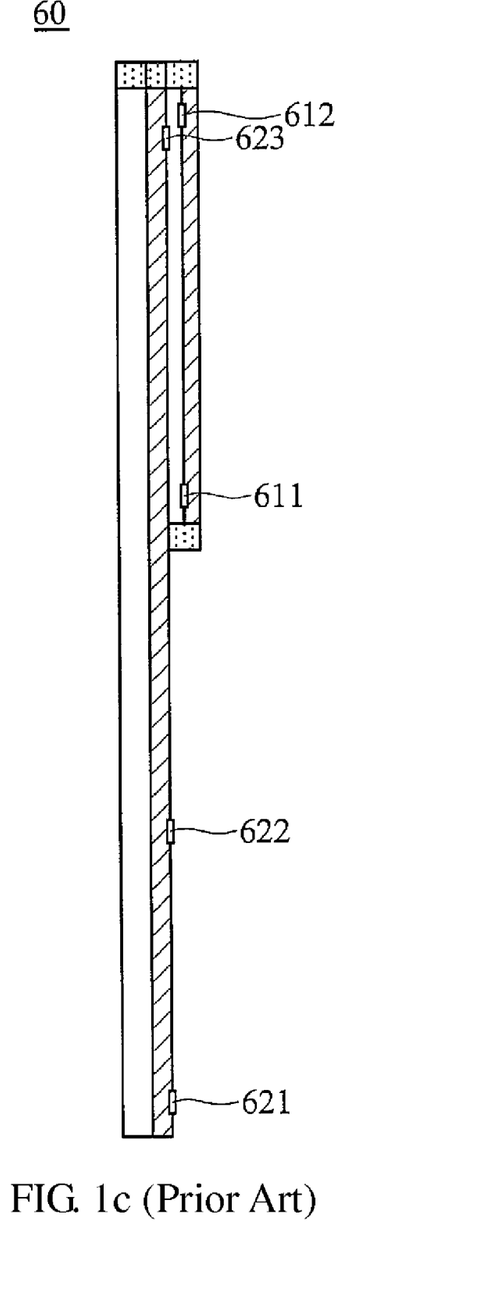
Figure 2:
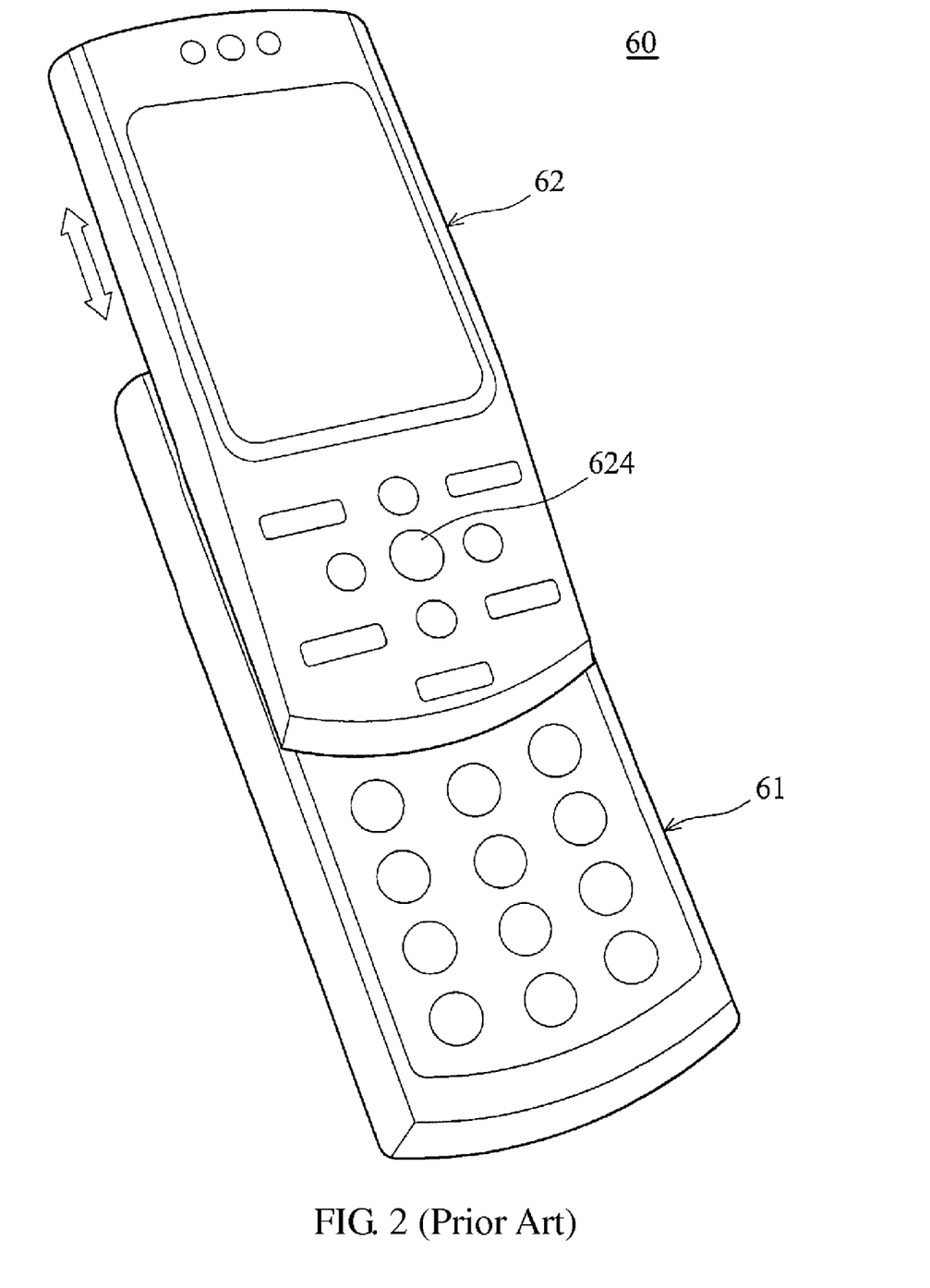

Chinese patent application No. 200580000096.0 which is titled "slider assembly for sliding-type mobile phone and cellular phone having the slider assembly" discloses a conventional slidable mobile phone 60, and please refer to FIG. 1a. Two magnetic elements 611 and 612 are provided on a main body 61, and three magnetic elements 621, 622 and 623 are provided on a sliding cover 62. When the sliding cover 62 slides downward along the arrow, repelling force is generated between the magnetic elements 611 and 621. The user has to overcome the repelling force to push downward the sliding cover. Please refer to FIG. 1b. When the sliding cover 62 moves to close to the position shown in FIG. 1b, the magnetic element 611 and the magnetic element 622 generate repelling force again, and the user needs to overcome the repelling force. Finally, when the sliding cover 62 moves to the position shown in FIG. 1c, the user has to overcome the repelling force generated by the magnetic element 612 and the magnetic element 623 for the last time. Although at the positions shown in FIG. 1a and FIG. 1c, the sliding cover 62 and the main body 61 position utilizing the repelling force between the magnetic elements 611, 621 and the magnetic elements 612, 623 (the user has to overcome the repelling force to move the sliding cover 62). The user won't move smoothly the sliding cover 62 from the position shown in FIG. 1a to the position shown in FIG. 1c for the repelling force, so that the conventional slidable mobile phone 60 cannot provide a good operation feel. Please refer to FIG. 2. Conventional keys 624 are provided on the sliding cover 62 of the slidable mobile phone 60, and can only provide a downward press function. Since functions of the mobile phone are increased day after day, and the conventional keys 624 cannot provide a browsing function to rapidly operate and control the mobile phone, a pointing device by detecting the pressed direction such as a joystick, or a browsing control key (such as a hall device) which can slide on a two-dimensional surface may be preferred choice.

Figure 3:
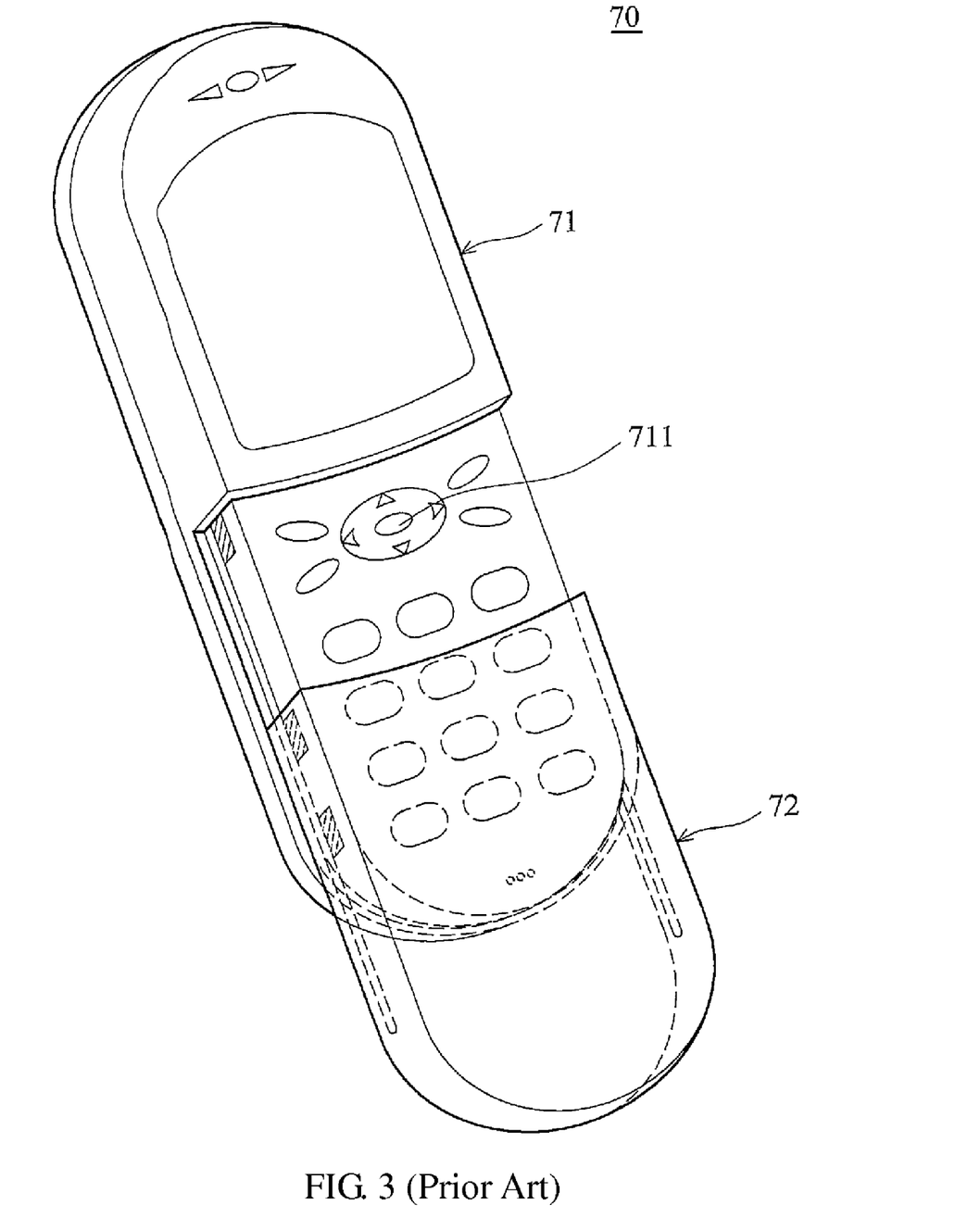
FIG. 3 is a schematic diagram showing another conventional slidable mobile phone.

U.S. Pat. No. 6,950,316 which is titled "electronic device with a slidable cover member" discloses a conventional slidable mobile phone 70. Please refer to FIG. 3. The slidable mobile phone 70 includes a main body 71 and a sliding cover 72. Conventional keys 711 are provided on the main body 71 and can only provide a downward press function. Considering the operation convenience and the appearance, the content shown in FIG. 1a and FIG. 1c may be another preferred choice. However, when a user operates the pointing device by detecting the pressed direction, he often needs to press the pointing device, and the sliding cover may be affected to move. The operation mechanism of the slidable mobile phone is set as follows. When the sliding cover downward slides for a distance, the call function of the slidable mobile phone is automatically interrupted, so that inconvenience of operation is easy to be generated, which makes manufacturers abandon using the pointing device by detecting the pressed direction as the input device of the slidable mobile phone.

Figure 4:
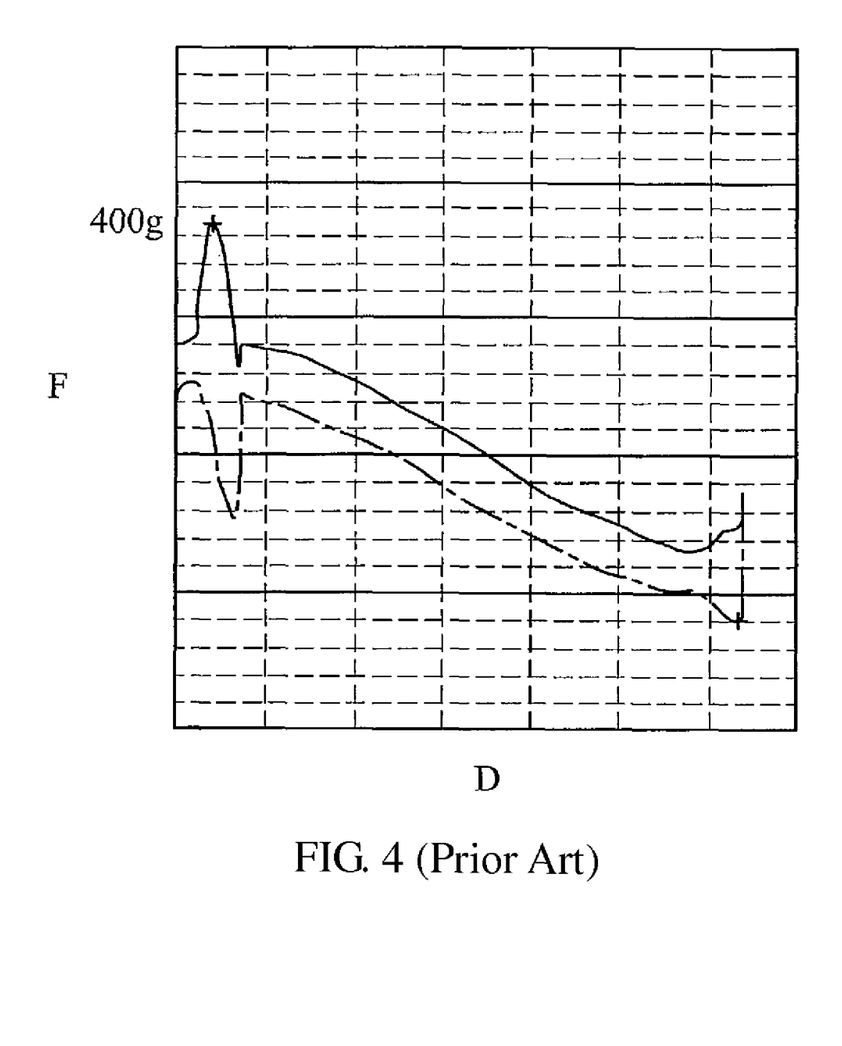
FIG. 4 is a relational graph showing the relationship between relative distances between the main body and the sliding cover of a conventional slidable mobile phone and forces applied by a user.

Please further refer to FIG. 4. At present, a spring is provided in a common slidable mobile phone and can provide a pull after the sliding cover arrives at a position (such as the turning point of the spring) to make the sliding cover be capable of automatically sliding to position, so that a user does not need to manually pull the sliding cover to a final fixed position. FIG. 4 is a relational graph showing the relationship between relative distances (D) between the main body and the sliding cover of a conventional slidable mobile phone and forces (F) applied by a user. The curve shown in FIG. 4 has an obvious cusp which stands for that an obvious smoothless feel occurs when the user moves the sliding cover, so that it can be known that the conventional slidable mobile phone cannot provide a preferred usage feel.

BRIEF SUMMARY OF THE INVENTION

The invention provides a slidable mobile phone.

A preferred embodiment of the invention includes a main body, a sliding cover and a positioning device. The main body includes a first combining component on which a first sliding part is provided, and the sliding cover includes a second combining component on which a second sliding part and a pointing device by detecting the pressed direction are provided. The second sliding part is slidably provided at the first sliding part to connect the first combining component and the second combining component each other, and the pointing device by detecting the pressed direction is used for controlling the slidable mobile phone. The positioning device includes two magnetic elements, and the magnetic elements are provided on the main body and the sliding cover, respectively. When the first combining component and the second combining component relatively slide to move the sliding cover to an opening position, the magnetic elements are corresponding and attracted each other to retain relative positions of the first combining component and the second combining component stably and stationarily.

In a preferred embodiment of the invention, one of the magnetic elements is disposed at the front end of the main body, and the other magnetic element is correspondingly disposed. Or one of the magnetic elements is disposed at the side of the main body, and the other magnetic element is correspondingly disposed. In addition, the two magnetic elements are both magnets, or one is a magnet and the other is a magnetized area, or both are magnetized areas. In addition, the main body and the sliding cover can have containers for holding magnets.

The invention provides another type of slidable mobile phone which includes a main body, a sliding cover and a positioning device. The main body includes a first combining component on which a first sliding part is provided, and the sliding cover includes a second combining component on which a second sliding part and a pointing device by detecting the pressed direction are provided. The second sliding part is slidably provided at the first sliding part to connect the first combining component and the second combining component each other, and the pointing device by detecting the pressed direction randomly is pressed on a two-dimensional surface to control the slidable mobile phone. The positioning device includes two magnetic elements, and the magnetic elements are provided on the main body and the sliding cover, respectively. The first combining component and the second combining component can relatively slide to make the sliding cover move to an opening position, and when the pointing device by detecting the pressed direction is moved by force, the magnetic attracting force makes relative positions of the first combining component and the second combining component remain stationary.

These and other features, aspects, and advantages of the present invention will become better understood with regard to the following description, appended claims, and accompanying drawings.

BRIEF DESCRIPTION OF THE SEVERAL VIEWS OF THE DRAWINGS

FIG. 2 is a schematic diagram showing the conventional slidable mobile phone in FIG. 1a;

DETAILED DESCRIPTION OF THE EMBODIMENTS

First Embodiment

Figure 5:
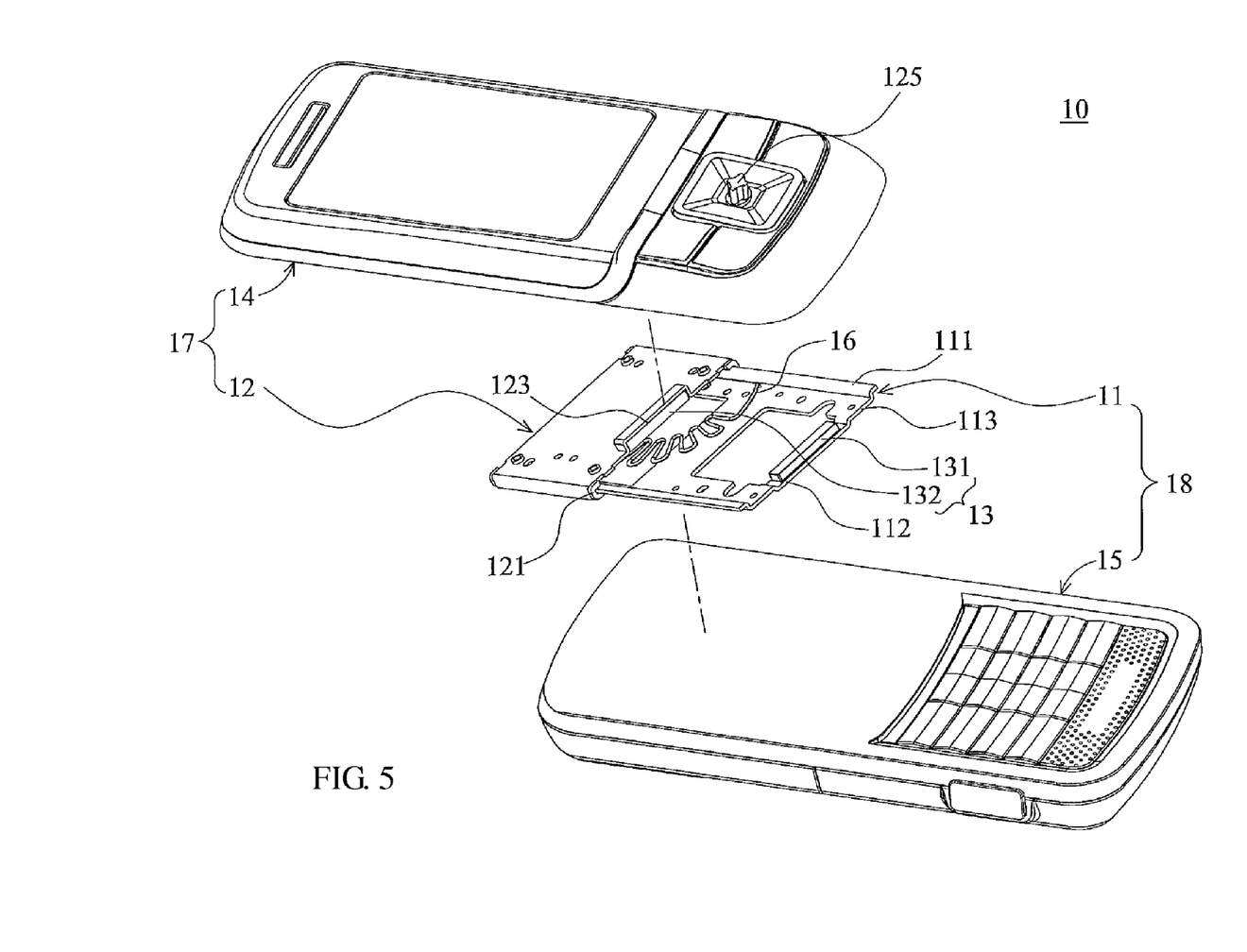
FIG. 5 is schematic diagram showing a slidable mobile phone of the first embodiment of the invention.

Please refer to FIG. 5, and FIG. 5 is structural diagram showing a slidable mobile phone 10 of the first embodiment of the invention. In the embodiment, the slidable mobile phone 10 includes a main body 18, a sliding cover 17, a positioning device 13, an upper casing 14 and a lower casing 15. The first combining component 11 includes a first sliding part 111 which is provided at two sides of the first combining component 11. The second combining component 12 includes a second sliding part 121 and a pointing device by detecting the pressed direction 125, wherein the second sliding part 121 is provided at two sides of the second combining component 12 and is U-shaped to cover two sides of the first combining component 11, so that the second sliding part 121 and the first sliding part 111 can be connected to each other and relatively slide. The pointing device by detecting the pressed direction 125 is used for controlling the slidable mobile phone 10 to provide a user with a function of browsing the slidable mobile phone 10. The positioning device 13 includes two magnetic elements 131 and 132, wherein the magnetic element 131 is provided at the first combining component 11, and the magnetic element 132 is provided on the second combining component 12. In the embodiment, the magnetic elements 131 and 132 are both magnets, and the first combining component 11 and the second combining component 12 include containers 112 and 123, respectively. The magnetic element (magnet) 131 is provided in the container 112 and the magnetic element (magnet) 132 is provided in the container 123. In addition, the first combining component 11 includes a front end 113, and the magnetic element 131 provided at the first combining component 11 in the embodiment is located on the front end 113, and the magnetic element 132 provided at the second combining component 12 is provided at a corresponding position. In addition, the magnetic elements (magnets) 131 and 132 can generate magnetic attracting force between them, and the pointing device by detecting the pressed direction 125 in the embodiment is a joystick.

In addition, the main body 11 in the embodiment further includes a spring 16 which is used to connect the first combining component 11 and the second combining component 12, and when the sliding cover 17 slides relatively to the main body 18, the spring 16 can provide a pull to make the sliding cover 17 automatically slide to position after the sliding cover 17 arrives a certain position (such as the turning point of the spring), so that a user does not need to manually push the sliding cover 17 to a final fixed position. However, the spring 16 mentioned in the embodiment, which provides semi-automatic efficacy, can be replaced with other equivalence elements.

Figure 6:
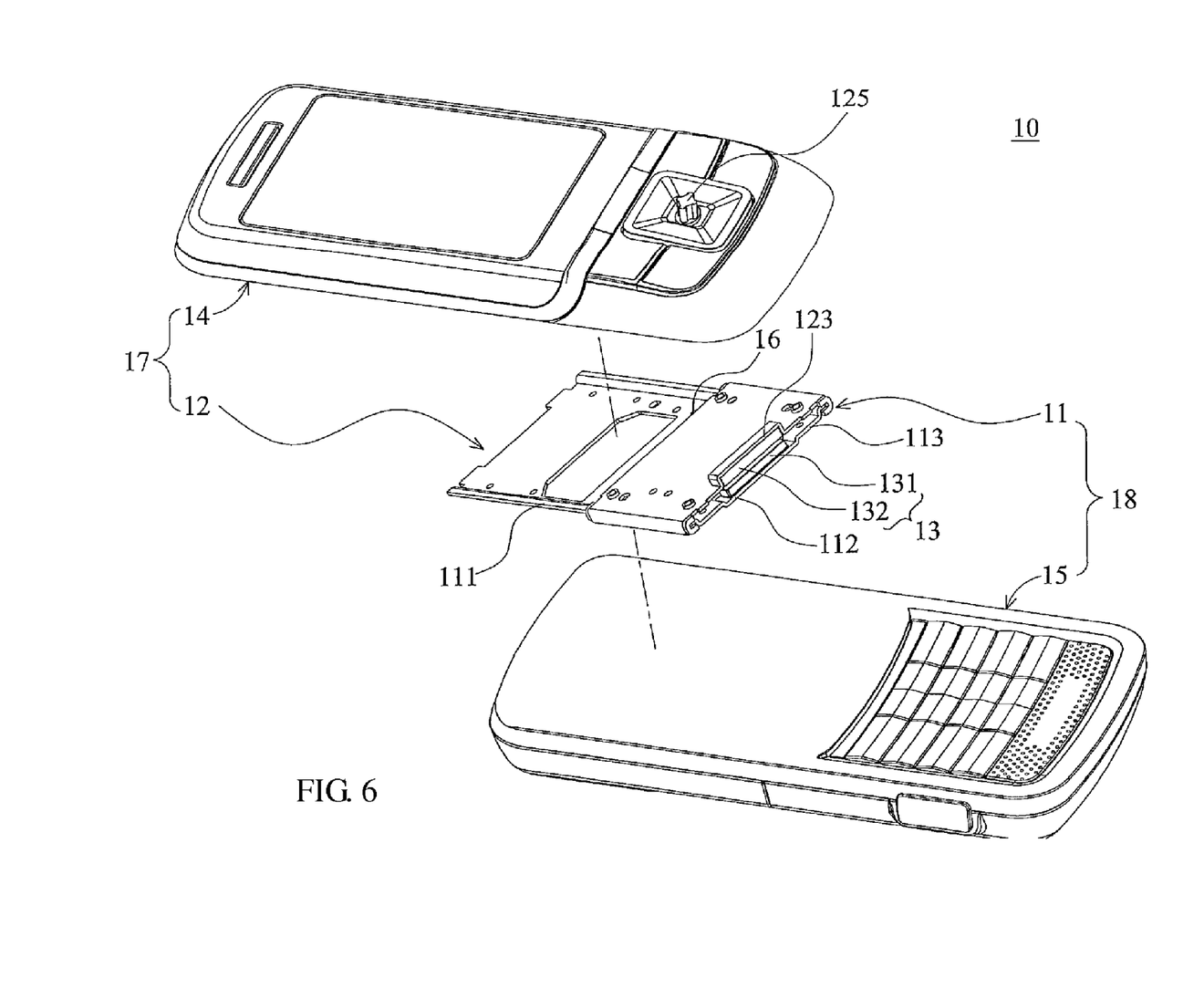
FIG. 6 is a schematic diagram showing the slidable mobile phone of the first embodiment, which is moved to an opening position.
Figure 7:
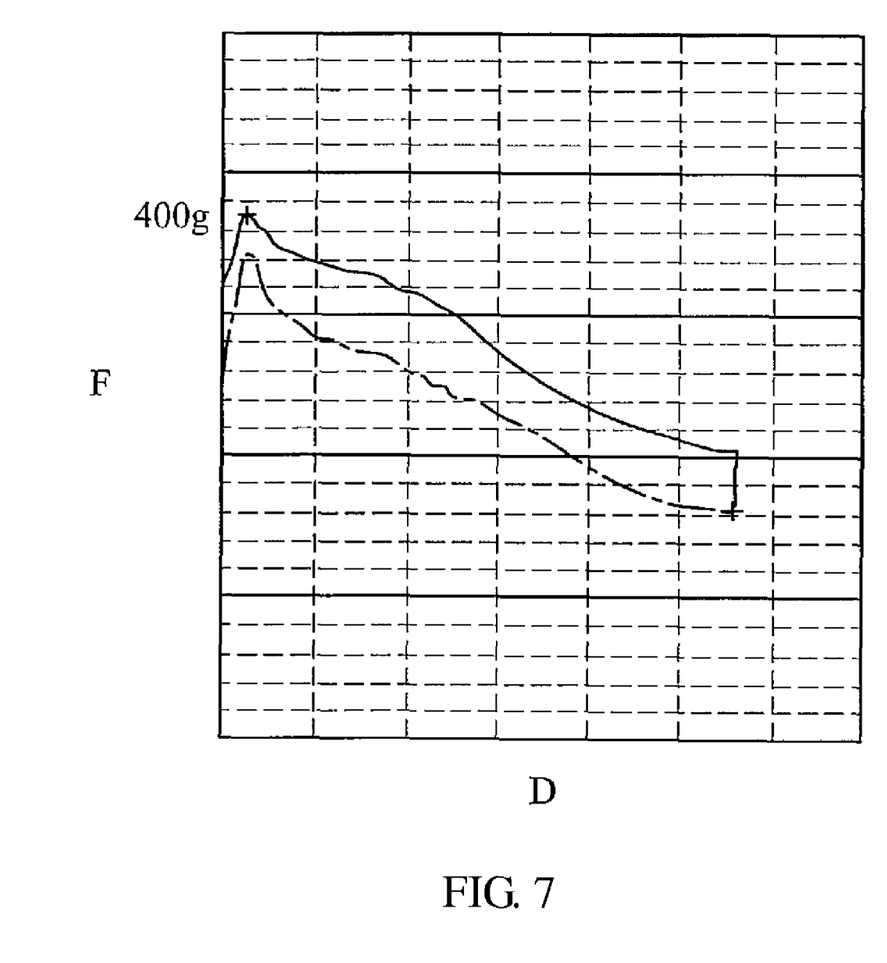
FIG. 7 is a relational graph showing the relationship between relative distances between the main body and the sliding cover of the slidable mobile phone of the invention and forces applied by a user.

Please refer to FIG. 6 and FIG. 7. When a user pushes the sliding cover 17 to make the second combining component 12 move to an opening position (which is shown in FIG. 6), the spring 16 can provide a pull to make the second combining component 12 automatically slide to the opening position after the second combining component 12 arrives at a certain position (such as the turning point of the spring). At this time, the magnetic elements 131 and 132 are located at the closest position and generate magnetic attracting force, so that the main body 18 and the sliding cover 17 can be retained at the opening position (a call is usually made at the opening position). If the user wants to utilize the pointing device by detecting the pressed direction 125 to operate the slidable mobile phone 10, the magnetic attracting force provided by the magnetic elements 131 and 132 can ensure that the main body 18 and the sliding cover 17 cannot move, so that the condition that the usage of the pointing device by detecting the pressed direction 125 during a call causes the call to be interrupted can be avoided. Please refer to FIG. 7, and FIG. 7 is a relational graph showing the relationship between the relative distances (D) between the first combining component 11 and the second combining component 12 and forces (F) applied by a user. Compared with the curve shown in FIG. 7, the curve shown in FIG. 4 is relatively smoothless, and when the user applies force to the sliding cover 17 (please refer to FIG. 5 simultaneously), an obvious smoothless feel occurs and causes the push feel to be bad. After the magnetic elements 131 and 132 are further provided, as shown in FIG. 7, the magnetic attracting force of the magnetic elements 131 and 132 changes the relationship curve and makes the relationship curve smoother, so that the smoothless feel is decreased when the user applies the force to the sliding cover 17, and the pull feel is obviously improved.

Second Embodiment

Figure 8:
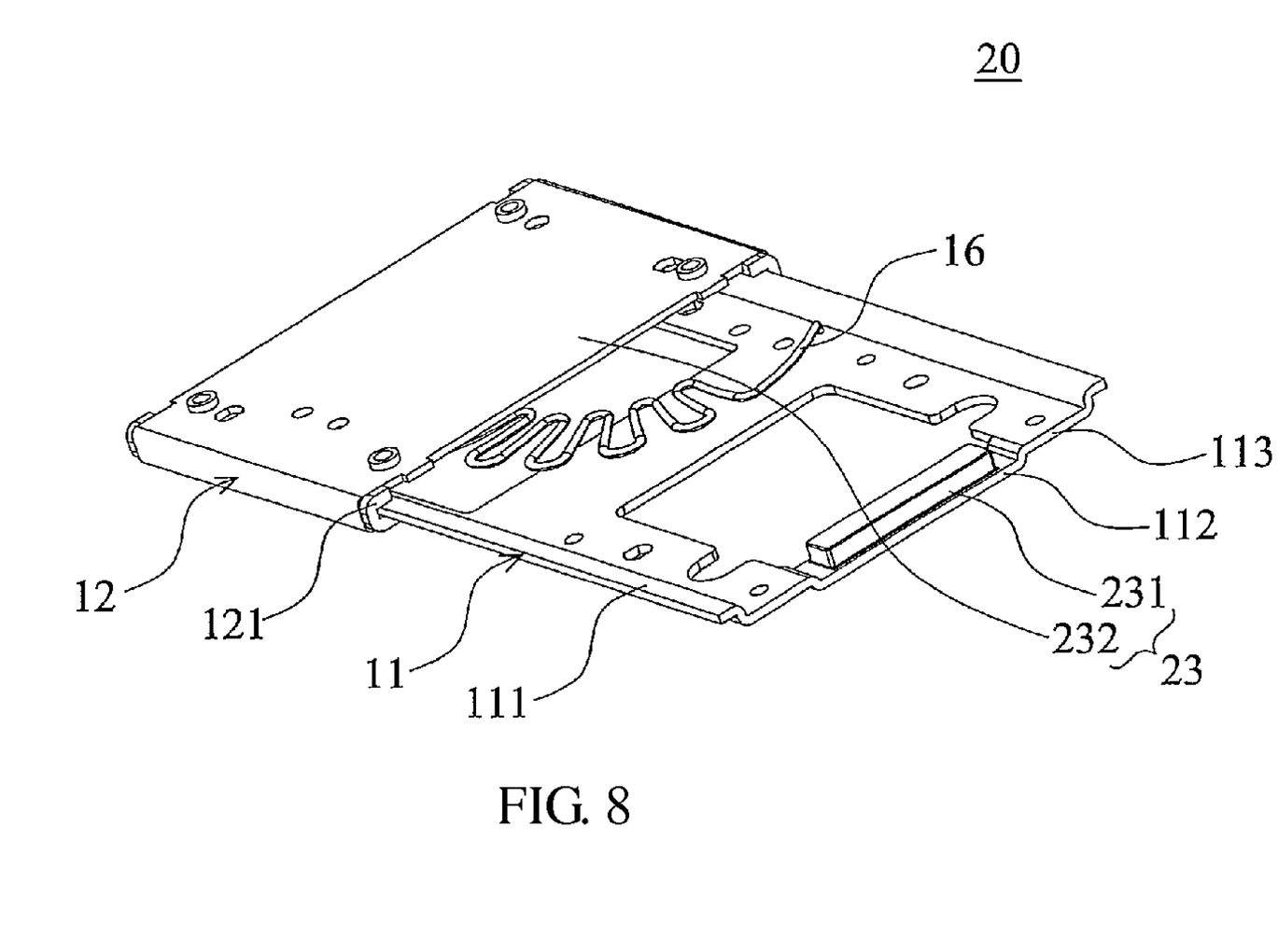
FIG. 8 is a schematic diagram showing a slidable mobile phone of the second embodiment of the invention.

Please refer to FIG. 8, and FIG. 8 is a schematic diagram showing a slidable mobile phone 20 of the second embodiment of the invention. The upper casing 14 and the lower casing 15 (please refer to FIG. 5 and FIG. 6) are omitted in FIG. 8, and only the assembly mode of the first combining component 11 and the second combining component 12 is shown.

In the embodiment, the structure of the slidable mobile phone 20 is approximately the same with the structure of the slidable mobile phone of the first embodiment, and the difference between them is the positioning device 23 in the embodiment, that is, the magnetic element 231 in the embodiment is a magnet, and the magnetic element 232 is a magnetized area on the second combining component 12, so that only the first combining component 11 in the embodiment has the container 112 for holding the magnetic element (magnet) 231. When the user pushes the sliding cover 17 to the opening position (which is shown in FIG. 5), the magnetic attracting force generated between the magnetic elements 231 and 232 makes the main body 18 and the sliding cover 17 retain at the opening position, and at this time, if the user wants to utilize the pointing device by detecting the pressed direction 125 to operate the slidable mobile phone 20, the magnetic attracting force provided by the magnetic elements 231 and 232 can ensure that the main body 18 and the sliding cover 17 cannot move, so that the condition that the usage of the pointing device by detecting the pressed direction 125 during a call causes the call to be interrupted can be avoided.

Third Embodiment

Figure 9:
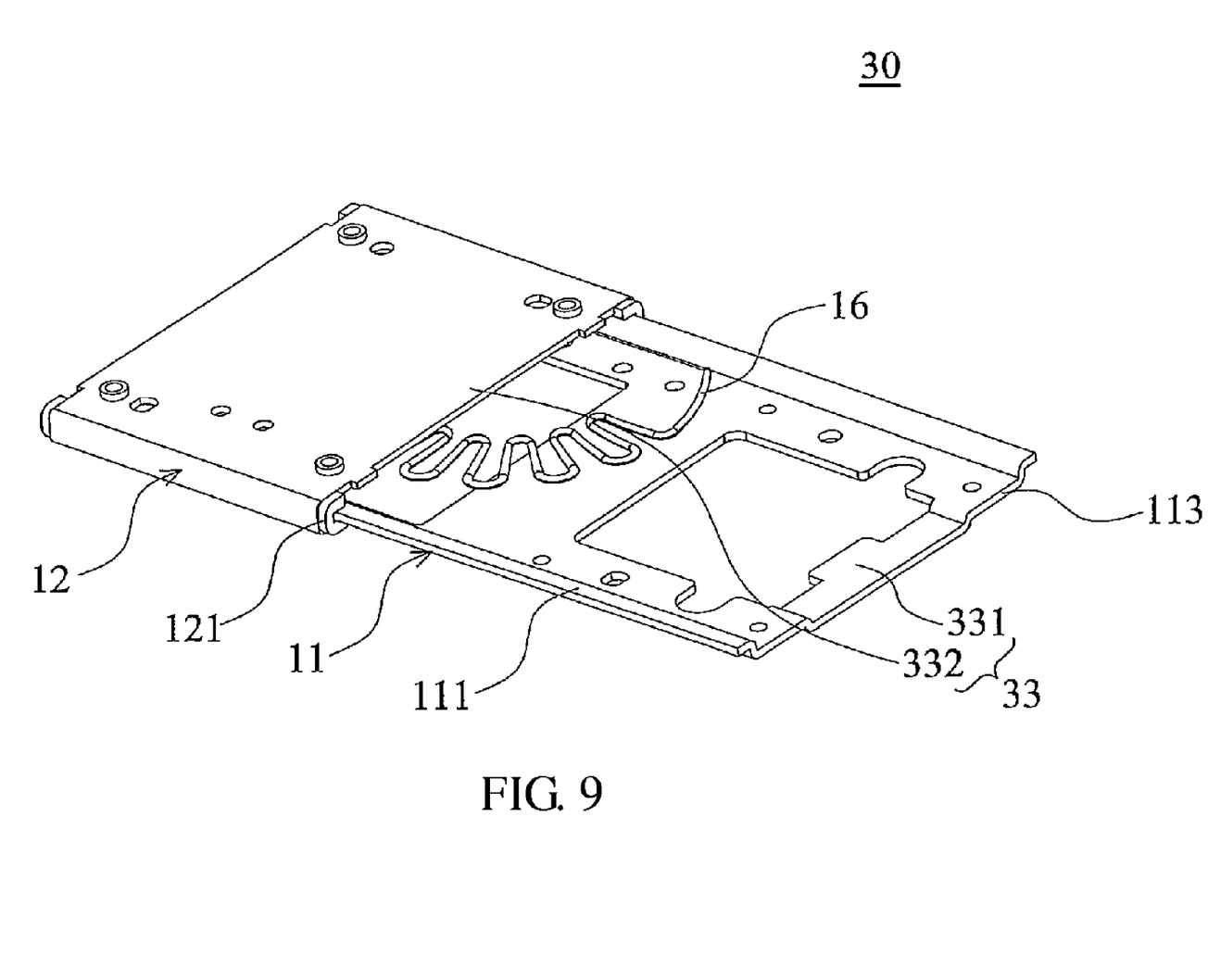
FIG. 9 is a schematic diagram showing a slidable mobile phone of the third embodiment of the invention.

Please refer to FIG. 9, and FIG. 9 is a schematic diagram showing a slidable mobile phone 30 of the third embodiment of the invention. The upper casing 14 and the lower casing 15 (please refer to FIG. 5 and FIG. 6) are omitted, and only the assembly mode of the first combining component 11 and the second combining component 12 is shown in FIG. 9.

In the embodiment, the structure of the slidable mobile phone 30 is approximately the same with the structure of the slidable mobile phone of the first embodiment, and the difference between them is the positioning device 33 in the embodiment, that is, magnetic elements 331 and 332 in the embodiment are both magnetized areas. When the user pushes the second combining component 12 to the opening position (which is shown in FIG. 5), the magnetic attracting force generated between the magnetic elements 331 and 332 makes the main body 18 and the sliding cover 17 retain at the opening position, and at this time, if the user wants to utilize the pointing device by detecting the pressed direction 125 to operate the slidable mobile phone 30, the magnetic attracting force provided by the magnetic elements 231 and 232 can ensure that the main body 18 and the sliding cover 17 cannot move, so that the condition that the usage of the pointing device by detecting the pressed direction 125 during a call causes the call to be interrupted can be avoided.

Fourth Embodiment

Figure 10:
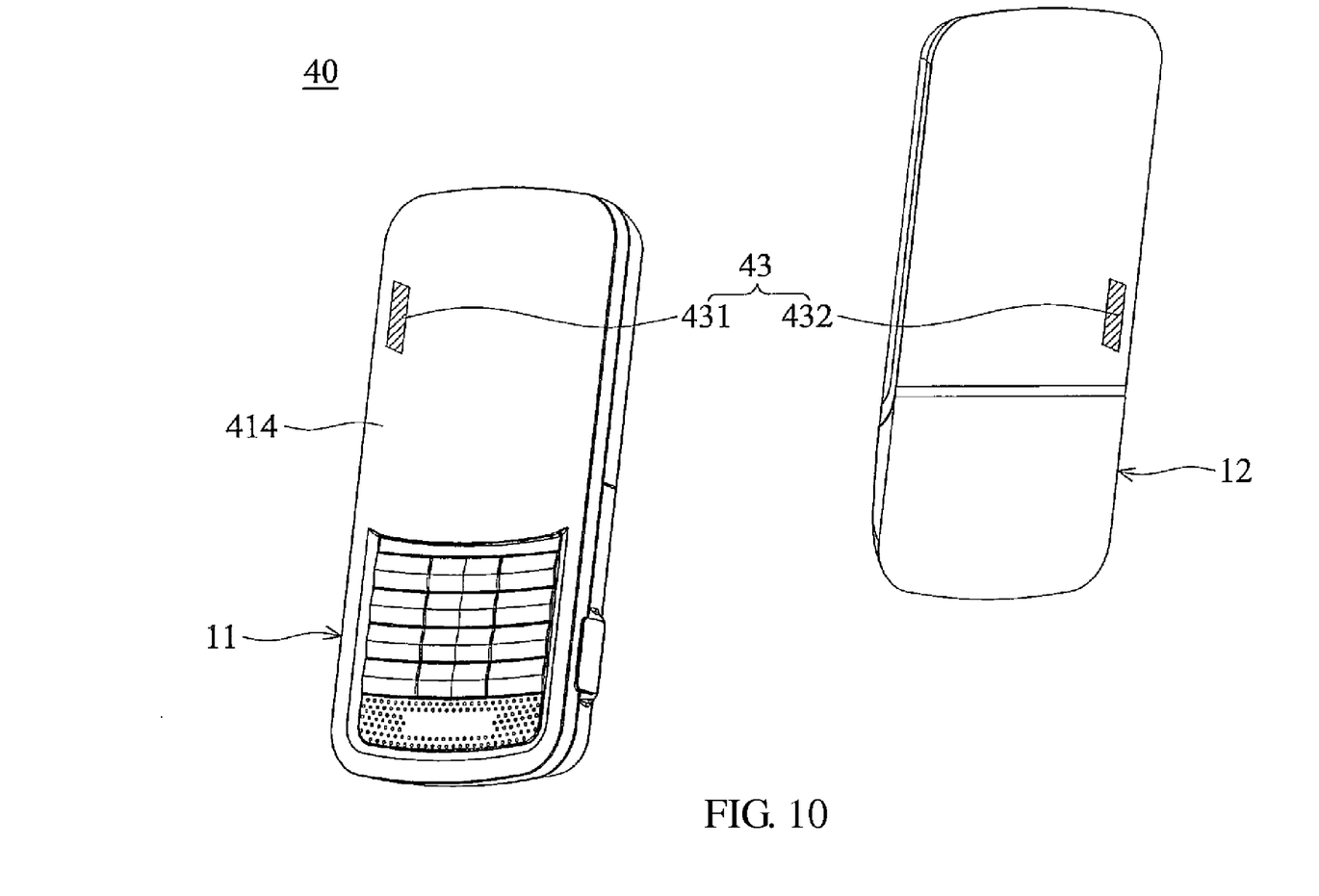
FIG. 10 is a schematic diagram showing a slidable mobile phone of the fourth embodiment of the invention.

Please refer to FIG. 10, and FIG. 10 is a schematic diagram showing a slidable mobile phone 40 of the fourth embodiment of the invention.

In the embodiment, the structure of the slidable mobile phone 40 is approximately the same with the structure of the slidable mobile phone of the first embodiment, and the difference between them is the position where the positioning device 43 is provided in the embodiment, that is, the magnetic element 431 is provided at the side edge 414 of the first combining component 11, and the magnetic element 432 is provided on the second combining component 12 and corresponding to the position of the magnetic element 431.

Fifth Embodiment

Figure 11:
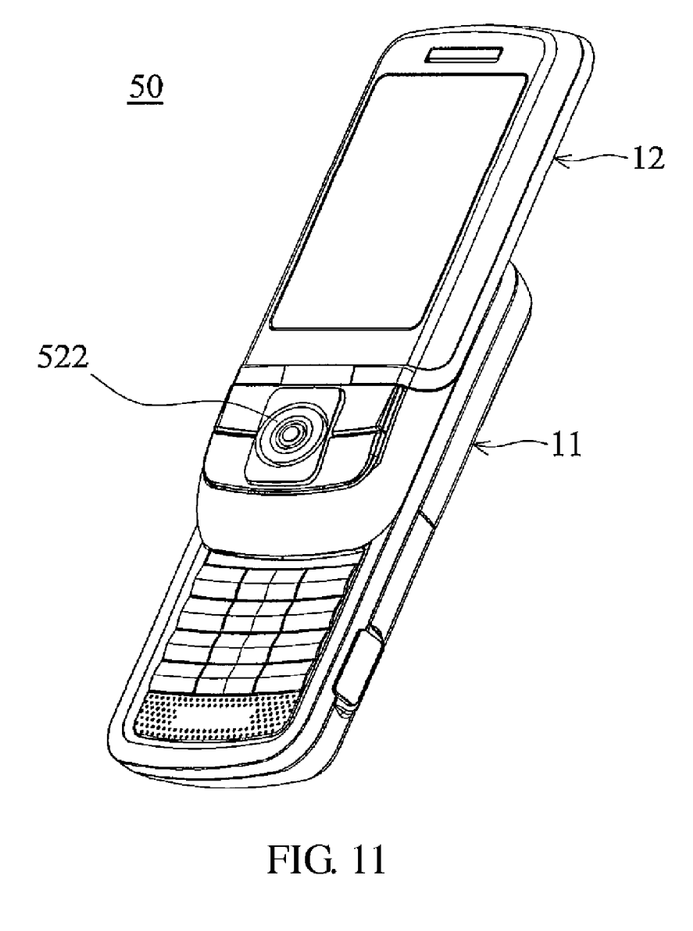
FIG. 11 is schematic diagram showing a slidable mobile phone of the fifth embodiment of the invention.

Please refer to FIG. 11. The structure of the slidable mobile phone 50 is approximately the same with the structure of the slidable mobile phone of the first embodiment, and the difference between them is that the embodiment is not applied to a slidable mobile phone having a joystick structure. The slidable mobile phone 50 have a pointing device by detecting the pressed direction 522 which is randomly pressed on a two-dimensional surface. The pointing device by detecting the pressed direction 522 is, for example, a hall device. Since the objective of the invention is to utilize the magnetic elements 131 and 132 (please refer to FIG. 5 simultaneously) which can generate magnetic attracting force to make the first combining component 11 and the second combining component 12 retain at the opening position, no matter the user utilizes the pointing device by detecting the pressed direction joystick) 125 or the pointing device by detecting the pressed direction (hall device) 522 to operate the slide mobile phone 10 or 50, the user has to apply force to the pointing device by detecting the pressed direction 125 or 522. However, the magnetic elements 131 and 132 of the invention can provide magnetic attracting force to ensure that the main body 18 and the sliding cover 17 can retain the relative position when the user operates the pointing device by detecting the pressed direction 125 or 522, so that the interruption of a call can be avoided.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A slidable mobile phone comprising:
a main body including a first combining component, which has a first sliding part;
a sliding cover including a second combining component which has a second sliding part and a pointing device by detecting a pressed direction, wherein the second sliding part is capable of being slidably provided at the first sliding part to connect the first combining component and the second combining component each other, and the pointing device by detecting the pressed direction is used for controlling the slidable mobile phone; and
a positioning device including two magnetic elements, wherein the magnetic elements are magnets and respectively provided on the main body and the sliding cover;
wherein the first combining component and the second combining component comprise a container, respectively, and the magnets are provided in the containers, respectively, and when the first combining component and the second combining component relatively slide to move the sliding cover to an opening position, the magnetic elements are corresponding and attracted each other to retain relative positions of the first combining component and the second combining component remain stably.

2. The slidable mobile phone according to claim 1, wherein one of the magnetic elements is provided at the front end of the main body.

3. The slidable mobile phone according to claim 1, wherein one of the magnetic elements is provided at the side of the main body.

4. The slidable mobile phone according to claim 1, wherein the magnetic elements are a magnet and a magnetized area, respectively.

5. The slidable mobile phone according to claim 1, wherein the magnetic elements are magnetized areas.

6. The slidable mobile phone according to claim 1, wherein the pointing device by detecting the pressed direction is a joystick.

7. A slidable mobile phone comprising:
a main body including a first combining component, wherein the first combining component has a first sliding part;
a sliding cover including a second combining component which has a second sliding part and a pointing device by detecting a pressed direction, wherein the second sliding part is capable of being slidably provided at the first sliding part to connect the first combining component and the second combining component each other, and the pointing device by detecting the pressed direction is capable of randomly pressed on a two-dimensional surface to browse and control the slidable mobile phone; and
a positioning device including two magnetic elements, wherein the magnetic elements are magnets and respectively provided on the main body and the sliding cover;
wherein the first combining component and the second combining component comprise a container, respectively, and the magnets are provided in the containers, respectively, and when the first combining component and the second combining component relatively slide to move the sliding cover to an opening position, the magnetic elements are corresponding and attracted each other, when the pointing device by detecting the pressed direction is moved by force, the magnetic attracting force retains relative positions of the first combining component and the second combining component remain stably.

8. The slidable mobile phone according to claim 7, wherein one of the magnetic elements is provided at the front end of the main body.

9. The slidable mobile phone according to claim 7, wherein one of the magnetic elements is provided at the side of the main body.

10. The slidable mobile phone according to claim 7, wherein the magnetic elements are a magnet and a magnetized area, respectively.

11. The slidable mobile phone according to claim 7, wherein the magnetic elements are magnetized areas.

12. The slidable mobile phone according to claim 7, wherein the pointing device by detecting the pressed direction is a hall device.

13. A slidable mobile phone comprising:
a main body including a first combining component, wherein the first combining component has a first sliding part;
a sliding cover including a second combining component which has a second sliding part, wherein the second sliding part is capable of being slidably provided at the first sliding part to connect the first combining component and the second combining component each other; and
a positioning device including two magnetic elements, wherein the magnetic elements are magnets and respectively provided on the main body and the sliding cover;
wherein the first combining component and the second combining component comprise a container, respectively, and the magnets are provided in the containers, respectively, and when the first combining component and the second combining component relatively slide to move the sliding cover to an opening position, the magnetic elements are corresponding and attracted each other to retain relative positions of the first combining component and the second combining component stably.

14. The slidable mobile phone according to claim 13, wherein the first combining component comprises a front end, and the magnetic element provided at the first combining component is provided at the front end, and the magnetic element provided at the second combining component is correspondingly provided.

15. The slidable mobile phone according to claim 13, wherein the first combining component comprises one side, and the magnetic element provided at the first combining component is provided at the side, and the magnetic element provided at the second combining component is correspondingly provided.

16. The slidable mobile phone according to claim 13, wherein the magnetic elements are a magnet and a magnetized area, respectively.

17. The slidable mobile phone according to claim 13, wherein the magnetic elements are magnetized areas.

* * * * *